United States Patent [19]

Dickerson

[11] Patent Number: 5,222,851

[45] Date of Patent: Jun. 29, 1993

[54] CLOSET BOLT ASSEMBLY

[76] Inventor: James A. Dickerson, 7101 Rothmore St., Charlotte, N.C. 28215

[21] Appl. No.: 917,362

[22] Filed: Jul. 23, 1992

[51] Int. Cl.$^5$ .......................... F16B 23/00; F16B 27/00
[52] U.S. Cl. ...................................... 411/397; 411/84; 411/104; 4/252.1
[58] Field of Search ................ 411/84, 85, 107, 383, 411/384, 396, 397, 104; 4/252.1, 252.2, 252.3

[56] References Cited

U.S. PATENT DOCUMENTS

| 789,553 | 5/1905 | Lang | 411/397 X |
|---|---|---|---|
| 1,507,488 | 9/1924 | Kraemer | 411/107 X |
| 4,227,722 | 10/1980 | Barber | 4/252.1 |
| 4,784,554 | 11/1988 | Break | 411/383 |
| 4,850,063 | 7/1989 | Abbate | 411/85 X |
| 4,907,923 | 3/1990 | McGrath, Jr. | 411/85 X |

Primary Examiner—Neill R. Wilson
Attorney, Agent, or Firm—Robert Halper

[57] ABSTRACT

A bolt head assembly comprises a circular bottom and a longitudinal straight walled section extending upwardly therefrom. Only the longitudinal section is threaded. A separate shank is threaded into an internal threaded portion of the bolt head. A washer and nut at the end of the bolt are used to secure a commode. In the event that the commode has to be replaced or any other exigency exists the shank can be easily removed from the head despite binding of the nut and washer to the bolt because of corrosion. Application of torque to the nut would cause the threaded shank to separate from the internal threaded portion of the head and be removed along with the nut and washer.

4 Claims, 1 Drawing Sheet

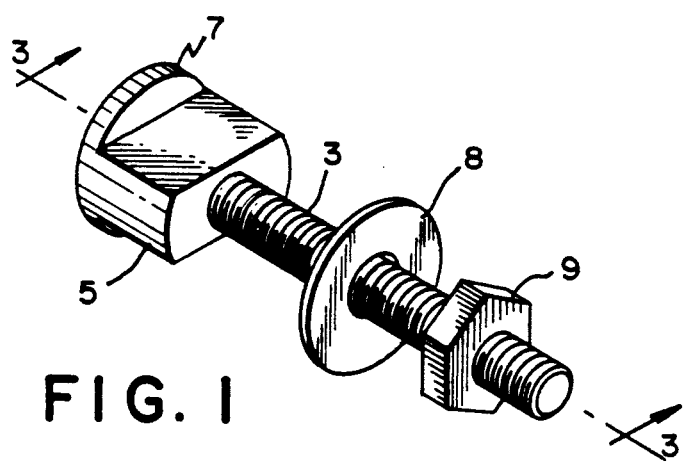
FIG. 1
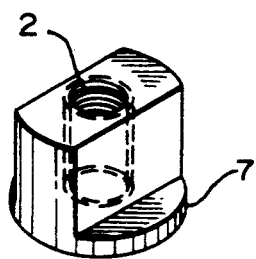
FIG. 2
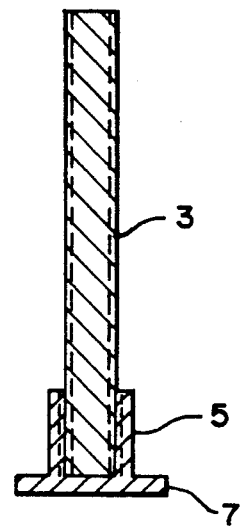
FIG. 3
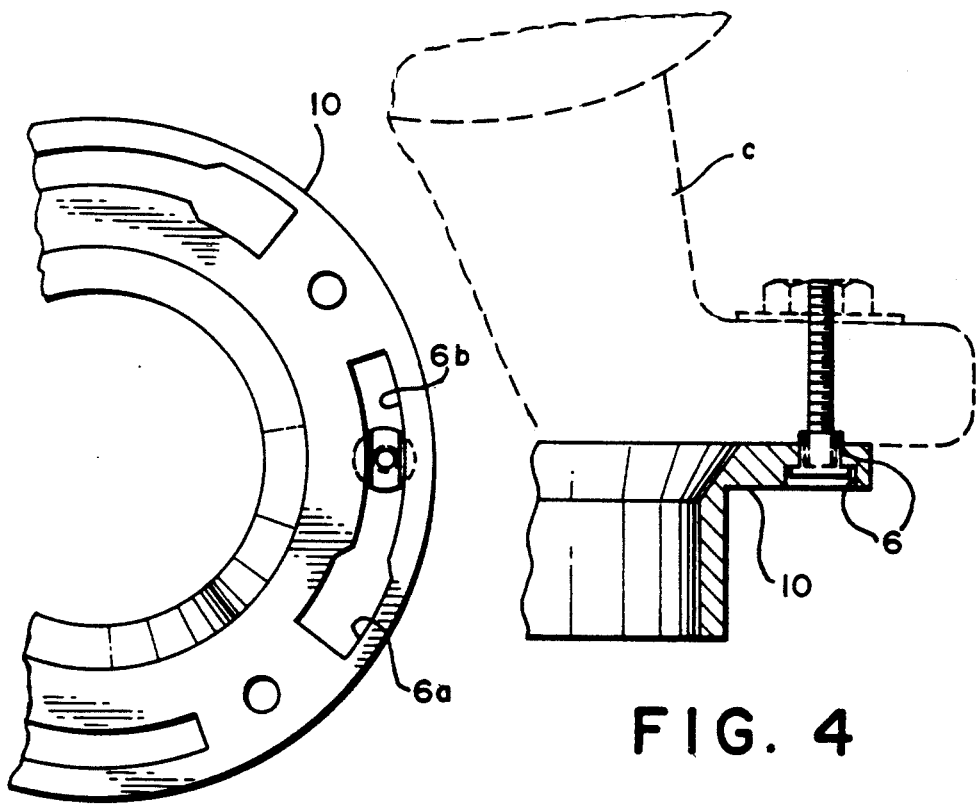
FIG. 4
FIG. 5

CLOSET BOLT ASSEMBLY

BACKGROUND OF THE INVENTION

The invention relates to the field of closet bolts and in particular to an improved closet bolt assembly that is made in two parts so that it can be disengaged from a commode flange in the event that the commode nuts and washers become rusted and bond to the shank.

When a commode is set in place, the commode is attached to a closet flange with a closet bolt a nut and a washer. After the nut and washer are tightened, the top part of the closet bolt (the part farthest away from the head) is cut off so that a cover cap will hide the nut and washer. After a period of time, the nut will become corroded and bond to the closet bowl. If the commode has to be removed for whatever reason, the nut and washer will also have to be removed. This becomes a very difficult task if the whole bolt turns.

DESCRIPTION OF THE PRIOR ART

Closet bolts are used to hold the commode to a closet flange by installing a closet flange to the sewer line through the use of bolts that fit into notches in the closet flange. The closet flange is then secured to the flooring.

While there are frangible bolts that are known in the art none that applicant is aware of are used to detach commode bolts from closet flanges. Nor is applicant aware of any commode bolt assemblies that are of applicant's unique construction.

Exemplary of the prior art are U.S. Pat. Nos. 789,553, 1,5007,488, 2,029,089, 3,339,215, 3,669,171, 4,227,722, 4,482,161, 4,850,063, 4,907,923, 4,957,402. While a number of these patents show features common to applicant's invention, namely closet flanges, closet bolts, a a nut 10 comprises an oval shaped retaining member 12, a cylindrical shaft extending upwardly therefrom and a guide member 14 in the shape of an ovoid, perpendicularly oriented with respect to retaining member 12. Only the guide member and the upper region of the shaft is threaded to receive a shank 44, washer 30 and nut 42 as in the embodiment of FIG. 6. The function of member 14 is to guide the toilet member 28 in to position. The guide member fits into the opening in the toilet.

SUMMARY OF THE INVENTION

The improved closet bolt of the present invention comprises a bolt head that is attached to the bottom ("bottom" in this context means that part of the shank adjacent the head) of the threaded shank by a threaded internal portion on the bolt head that is joined to the threads on the bottom of the shank. Thus the bolt is designed in two pieces, shank and head, so that in the event the threaded shank becomes corroded and joined to the nut and/or washer, the shank can be detached from the inside threads of the bolt head and easily removed so that a new seal and bolt may be installed.

It is the object of this invention to provide an improved closet bolt that can be easily detached from a closet flange in the event the shank is bonded to the nut and washer.

Another objective of the invention is to construct a closet bolt assembly that is built of two parts.

Yet another objective of the invention is to provide a closet bolt that can easily be removed in the event it becomes corroded.

Still another objective of this invention is to provide a closet bolt head that has a built up portion just above the bottom of the head so as to assure that the head of the bolt can not turn in the closet two piece bolt having a head and threaded shank, securing a bolt head in a slot, none of these patents is concerned with what the applicant regards as his invention, namely easy disassembly of a shank of a bolt in the event of binding of a nut and washer to the shank due to corrosion.

One of the more pertinent patents cited above, U.S. Pat. No. 1,507,488 teaches a threaded shank that fits into an internally threaded head. This patent, however, is not only functionally different, but more significantly it is structurally different. The bolt of U.S. Pat. No. 1,507,488 is meant to be adjustable so as to be adapted for clamping of different size articles on a machine table. Structurally, the threaded bolt 16 fits at its lower region into a hollow unthreaded portion 22 of sleeve 12. The upper portion of the head that receives the threaded bolt is circular whereas the lower portion of the head that fits into a T-slot is arcuate on two sides with straight walls on two sides. More significantly an intermediate threaded portion of the bolt is secured to sleeve 12 with a lock nut. If this lock nut were to be corroded and bonded to the sleeve, it would not be possible to unscrew the bolt from the threaded portion of the sleeve even if it were to be assumed that the head itself would not spin in the T-slot 11. (note the two arcuate sides of the head).

Another patent that deserves some mentioned is U.S. Pat. No. 4,277,722. The fastening means of this patent is directed to the environment of applicant's patent, namely securing a commode to a closet flange. While U.S. Pat. No. 4,227,722 was not concerned with the problem of corrosion, the patent does provide for fitting retaining member 12 of nut 10 in channel 35 and because its longitudinal dimension is greater, it will not spin. The structure of the fastening means of U.S. Pat. No. 4,227,722 is quite different in that flange thus enabling the easy release of the threaded shank in case the nut and washer bond to the shank.

Other advantages of the invention should be apparent to those skilled in the art from the written description below.

BRIEF DESCRIPTION OF THE DRAWINGS

FIG. 1 shows a perspective view of the closet bolt assembly.

FIG. 2 shows a perspective view of the head of the bolt showing the internal threading.

FIG. 3 is a section taken through FIG. 1 showing threading of the shank down to the base of the head.

FIG. 4 shows a frontal view of the closet flange with the bolt head and shank extending through the closet flange and a portion of the commode or toilet bowl in phantom.

FIG. 5 is a plan view of the closet flange showing a portion of the head of the bolt secured in a slot in the closet flange.

DESCRIPTION OF THE PREFERRED EMBODIMENT

The closet bolt of the present invention is constructed of two parts and may be of any standard material such as steel, brass, plastic, etc. The bolt comprises a bolt head which starts as a circular base 7 as shown in FIG. 1. Extending from the base is a built up portion 5 which is generally rectangular in shape. Portion 5 has an internal threaded section 2 which starts on a line with the interior of the base and ends at the top of portion 5. This threaded section is capable of fitting onto the bottom of a threaded shank 3 that makes up the other part of the bolt. The shank is threaded for its entire length and its bottom is threaded into the interior of the base and is jammed against the base interior to produce a stable, secure fit. By virtue of the raised built up portion of the bolt head, the head will fit snugly in notches 6 of closet flange 10 as seen in FIG. 4. Consequently the base will not spin within the flange upon application of torque to the nut to release the shank from the bolt head.

By placing the entire bolt assembly through a flange notch, with the base of the bolt being first located below the closet flange, a commode C can be secured to the closet flange. After location of the bolt assembly, the commode is put in place and secured by attaching a washer 8 and nut 9 to the top of the shank.

As stated above the shank portion of the bolt is threaded its entire length. The bottom portion of the shank is threaded into the interior threaded portion of the bolt head for its entire extent to the interior of the base and forms a tightly held assembly. The closet flange 10 has an enlarged notch portion 6a and a narrow notch portion 6b. The aforesaid assembly is placed into the enlarged notch portion and is then slid into the narrow notch portion. Since the upper portion of the head fits down into this narrow notch portion, the bolt head is restrained from movement in the event of application of force to the threaded shank.

Thus with the present invention the problems faced in the past with corroded closet bolts have been nullified. The shank may now be simply removed by unscrewing from the head. The torque applied to the upper shank through the nut would be enough to overcome the threaded connection between bolt head and the bottom of the shank. Once the bolt has been removed, the commode can be freed from the closet flange.

While this invention has been described in detail with respect to a specific embodiment, it should be understood that various modifications can be effected and that certain changes in the form and arrangement of parts may be made within the spirit and scope of the invention as described above and as defined in the appended claims.

I claim:

1. A two piece closet bolt adapted for easy removal from attachment to a commode comprising a bolt head having a rounded base, a longitudinal section extending upwardly from said base having straight parallel side walls, said section having an internal threaded portion that runs the length of said side walls to an entrance opposite said base, a threaded shank that fits into said internal threaded section, said shank passing from said entrance down through said internal threaded section and extending upwardly from the entrance past a slot in a closet flange, said straight walls of said head fitting securely and immovably within said slot after assembly and fastening to said commode, said commode being placed over said shank and securing said commode to said closet flange by a nut and washer, said shank of the bolt being easily removed from said internal threaded portion of said head in the event of corrosion and binding of said nut and washer to said shank, said shank being removed from said internal threaded portion by application of torque to said nut.

2. A two piece closet bolt as in claim 1 wherein said rounded base is circular in cross section and said entire longitudinal section is substantially rectangular.

3. A two piece closet bolt as in claim 2 wherein the height of said base is 1/16", said slot in said closet flange having a large portion and a narrow portion, in the course of assembly said closet bolt being placed in the large portion and slid into said narrow portion with said straight walls non-rotatably fitted into said narrow portion.

4. A two piece closet bolt as in claim 3 wherein said threaded shank is threaded in said internal threaded portion of said straight wall section to the interior of said base said shank being jammed against said interior to form a stable tight fit.

* * * * *